United States Patent
Lucea

(10) Patent No.: US 9,705,340 B2
(45) Date of Patent: Jul. 11, 2017

(54) METHOD AND SYSTEM FOR MANAGING THE ELECTRIC CHARGES OF BATTERY CELLS

(71) Applicant: RENAULT s.a.s., Boulogne-billancourt (FR)

(72) Inventor: Marc Lucea, Boulogne-billancourt (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 277 days.

(21) Appl. No.: 14/355,123

(22) PCT Filed: Sep. 20, 2012

(86) PCT No.: PCT/FR2012/052093
§ 371 (c)(1),
(2) Date: Jun. 10, 2014

(87) PCT Pub. No.: WO2013/064759
PCT Pub. Date: May 10, 2013

(65) Prior Publication Data
US 2014/0327407 A1 Nov. 6, 2014

(30) Foreign Application Priority Data
Oct. 31, 2011 (FR) ...................................... 11 59881

(51) Int. Cl.
*H02J 7/00* (2006.01)
*B60L 11/18* (2006.01)
(Continued)

(52) U.S. Cl.
CPC ............. *H02J 7/00* (2013.01); *B60L 11/1866* (2013.01); *H01M 10/441* (2013.01);
(Continued)

(58) Field of Classification Search
CPC ...... H02J 7/0016; H02J 7/0021; H02J 7/0014; H02J 7/0019; H02J 7/0031; H02J 7/345;
(Continued)

(56) References Cited

U.S. PATENT DOCUMENTS

2006/0097698 A1 5/2006 Plett
2008/0252266 A1* 10/2008 Bolz .................. G01R 31/3658
320/166

(Continued)

FOREIGN PATENT DOCUMENTS

JP 2008-271708 A 11/2008

OTHER PUBLICATIONS

International Search Report issued Jul. 4, 2013 in PCT/FR2012/052093.
French Preliminary Search Report issued May 21, 2012 in Patent Application No. FR 1159881 (with English translation of Categories of Cited Documents).
(Continued)

*Primary Examiner* — Binh Tat
(74) *Attorney, Agent, or Firm* — Oblon, McClelland, Maier & Neustadt, L.L.P.

(57) ABSTRACT

A method and system for management of electric charges of cells of an electricity storage battery, which are electrically connected in series and/or in parallel, the method including: balancing states of charge of the cells, performed only during a battery charging phase; and balancing quantities of charge contained in the cells, performed only during a battery discharging or rest phase.

10 Claims, 3 Drawing Sheets

(51) Int. Cl.
 *H01M 10/44* (2006.01)
 *H01M 10/42* (2006.01)
(52) U.S. Cl.
 CPC ... *H02J 7/0014* (2013.01); *H01M 2010/4271* (2013.01); *Y02T 10/7011* (2013.01); *Y02T 10/7055* (2013.01); *Y02T 10/7061* (2013.01)
(58) Field of Classification Search
 CPC .................. H02J 7/0026; H02J 7/0036; H02J 2007/0059; H02J 7/0024; H02J 7/0057; H02J 7/007; H02J 7/047; H02J 5/005; H02J 7/025; H02J 17/00; H02J 2007/0096; H02J 7/0045; H02J 2007/0001; H02J 50/12; H02J 7/0003; H02J 7/0068
 USPC .................................................. 320/128–136
 See application file for complete search history.

(56) References Cited

U.S. PATENT DOCUMENTS

| | | | |
|---|---|---|---|
| 2009/0278488 A1 | 11/2009 | Choi et al. | |
| 2011/0215760 A1* | 9/2011 | van Lammeren | H02J 7/0014 |
| | | | 320/116 |
| 2011/0309796 A1* | 12/2011 | Firehammer | H02J 7/0018 |
| | | | 320/118 |

OTHER PUBLICATIONS

Yuang-Shung Lee, et al., "Intelligent Control Battery Equalization for Series Connected Lithium-Ion Battery Strings" IEEE Transactions on Industrial Electronics, vol. 52, No. 5, XP011139886, Oct. 1, 2005, pp. 1297-1307.

* cited by examiner

METHOD AND SYSTEM FOR MANAGING THE ELECTRIC CHARGES OF BATTERY CELLS

TECHNICAL FIELD OF THE INVENTION

The invention relates to a method for managing the electric charges of cells of an electricity storage battery, which are electrically connected in series and/or in parallel, and to a management system comprising a balancing electronic circuit controlled so as to implement such a method.

PRIOR ART

The Li-ion (lithium-ion) battery technology, used widely in different industrial sectors and in particular in the automotive industry, requires the use of balancing circuits in order to ensure the long-term use of the battery. These balancing circuits are generally part of the battery management system.

In fact, each Li-ion cell (of which the assembly in series and in parallel makes it possible to construct the battery) must without fail remain within a narrow voltage range at the risk of impairing the performances of the cell irreversibly. If a large number of cells are assembled within a battery (typically 96 bi-cells within batteries still under development for electric vehicles), it is inevitable that these cells will have different characteristics, all the more so as the battery ages: non-identical variations of some characteristics having a direct impact on the state of charge of the cells (self-discharge current, faradic yield, maximum charge, etc.) will therefore be observed among all the cells. Since the main current passing through the battery is the same at each cell (with the conventional structures of batteries used in the automotive industry), it is not possible during the charging or discharging phases of the battery to individually charge or discharge one or more cells without the use of additional means.

Other types of electrochemical cells (lead cells for example) do not have the same constraints as those based on lithium in terms of the accessible voltage range. During charging, parasitic reactions that do not impair the performances of the cell make it possible to dissipate the surplus energy once the maximum state of charge of the cell has been reached. Conversely, very severe discharge processes (until the charge contained in the cell is almost zero) are also possible. For these types of electrochemical cells, the easiest way of balancing the battery, that is to say of bringing all the individual cells to the same state of charge, thus consists in continuing with the charging until all the cells are fully charged.

However, this strategy is not possible with all types of cells, in particular Li-ion cells: as soon as a single cell has reached its upper voltage threshold (typically 4.2 V), it is imperative to interrupt the charging at the risk of damaging the cell (or even starting a fire). Dedicated electronic circuits are used, referred to as balancing circuits, which make it possible:

either to dissipate the energy in the first cells charged so as to be able to then continue charging the entire battery: this is referred to as dissipative balancing,
  or to transfer the energy of the cells charged to the greatest extent to other cells: this is thus known as non-dissipative balancing.

The non-dissipative balancing circuits have a number of advantages compared with the dissipative systems:

the radiated heat is lower, knowing that increased temperatures may damage both the Li-ion cells and the electronic circuits,
  it is possible to use these circuits during use of the battery, in particular during the discharge, so as to optimize the distribution of the individual charges of each cell, the objective being ideally to arrive at the minimum state of charge of each cell simultaneously. This thus allows an improved use of the battery, in so far as all the charges contained in the individual cells are utilized: the limit of the first cell reaching its minimum state of charge threshold is delayed.

So as to be able to make the most of the possibilities offered by these balancing circuits, in particular non-dissipative balancing circuits, it is necessary to devise strategies suitable for avoiding useless and even adverse transfers of charge, both in charging and discharging situations.

The known balancing strategies are based either on the individual states of charge ("SoC") of each cell or on the direct measurement of the individual voltage of each cell. The use of these criteria does not always allow the best use of the energy contained in the battery. These strategies are indeed adapted to dissipative balancing circuits (which have been widespread for a number of years), but do not take into account all the possibilities offered by non-dissipative circuits (which currently are not very widespread). Generally, the only objective is to balance the states of charge of the cells at the end of charging. The dissipation of energy during discharging, by contrast, never results in an increase of the usage rate of the battery:

if the balancing circuit used is of the dissipative type, the total charge used during discharging corresponds to that contained in the cell having the lowest maximum charge. The surplus energy contained in the other cells is dissipated during discharging and therefore is not utilized in a productive manner,
  if the balancing circuit is of the non-dissipative type, the total charge used during discharging corresponds to that contained in the cell having the lowest maximum charge, plus some of the surplus charge contained in the other cells. This surplus therefore is not dissipated entirely in order to arrive at the final state, but is utilized in part.

Documents U.S. Pat. No. 6,215,281, U.S. Pat. No. 5,631,534, and U.S. Pat. No. 7,245,108 describe balancing solutions of this type, relying only on the states of charge of the cells, without distinguishing between the cases of charging and discharging, which is not optimal.

Document US2010 194339 discloses a balancing solution utilizing an additional parameter, that is to say providing a verification of the level of maximum charge capacity of the cells.

None of these solutions allows optimum management of a battery, in particular in the case of discrepancies of certain characteristics of the cells. The operating mode of the battery (charging, resting or discharging) is not taken into consideration in the balancing strategy.

OBJECT OF THE INVENTION

The objective of the present invention is to propose a solution for managing the electric charges of cells of a battery which overcomes the above-listed disadvantages.

In particular, one object of the invention is to provide a management method that avoids useless or adverse transfers of energy in the presence of discrepancies over the physical characteristics of the cells.

A second object of the invention is to provide a management method that is not only based on the states of charge "SoC" of the cells or on the individual voltages thereof, in particular in a discharging or rest state of the battery.

A first aspect of the invention concerns a method for managing the electric charges of cells of an electricity storage battery, which are electrically connected in series and/or in parallel, comprising:
- a step in which the states of charge of the cells are balanced, this step being performed only during the battery charging phase, and
- a step in which the quantities of charge contained in the cells are balanced, this step being performed only during the battery discharging or rest phase.

The step in which the quantities of charge contained in the cells are balanced may utilize the states of charge.

The balancing performed may be of the non-dissipative type, by transfer of energy between the cells.

The method may comprise the following steps:
- establishment of balancing criteria based selectively on the states of charge of the cells or on the quantity of charge contained in the cells,
- generation of activation requests, dependent on the established balancing criteria, for activation of an electronic balancing circuit for balancing the cells of the battery, and emission to the balancing circuit of the generated activation requests so as to ensure a balancing of the battery in accordance with the established criteria.

The activation requests dependent on the balancing criteria based on the quantity of charge contained in the cells may be dependent on the states of charge of the cells.

The establishment step may utilize the fact that the battery is or is not in the charging phase.

The method may comprise a prior step of determining the state of charge, the state of health of each of the cells, and a Boolean signal representative of the fact that the battery is or is not in the charging phase.

A second aspect of the invention concerns a system for managing the electric charges of cells of an electricity storage battery, which are electrically connected in series and/or in parallel, comprising an electronic balancing circuit for balancing the electric charges of the cells, said circuit comprising hardware and/or software means, which control the balancing circuit so as to perform a management method of this type.

The hardware and/or software means preferably comprise a control unit ensuring:
- establishment of balancing criteria based selectively on the states of charge of the cells or on the quantities of charge contained in the cells,
- generation of activation requests dependent on the established balancing criteria, for activation of the electronic balancing circuit for balancing the cells of the battery, and emission to the balancing circuit of the generated activation requests so as to ensure a balancing of the battery in accordance with the established criteria.

A third aspect of the invention concerns a data recording support, which can be read by the control unit and on which a computer program is recorded comprising computer program code means for performing phases and/or steps of such a method.

A fourth aspect of the invention concerns a computer program comprising a computer program code means suitable for carrying out phases and/or steps of such a method when the program is run on the control unit.

DESCRIPTION OF THE DRAWINGS

Further advantages and features will become clearer from the following description of specific embodiments of the invention given by way of non-limiting example and shown in the accompanying drawings, in which.

DESCRIPTION OF PREFERRED
EMBODIMENTS OF THE INVENTION

The invention concerns the field of balancing the electric charges of individual cells of an electricity storage battery, in which these cells are assembled in series and/or in parallel.

Hereinafter, the notion of balancing is to be understood as the balancing of the states of charge $SoC_i$ or of the quantities of charge $Q_i$ (depending on whether the battery is in the charging, discharging or rest phase) for all the cells forming the battery. This balancing takes into account for the cells any differences in physical characteristics, which may develop over time, with the objective of utilizing the stored energy to the best possible extent whilst ensuring the longest possible service life of the battery.

The invention is thus based on the assertion that has been made, in accordance with which, in the case of differences in physical characteristics between the different cells, the simple utilization of the state of charge of said cells as a balancing criterion during the charging and discharging of the battery is not satisfactory. This is particularly the case when the cells have discrepancies of maximum capacities (also referred to as "maximum charges") between themselves.

Figure 1:
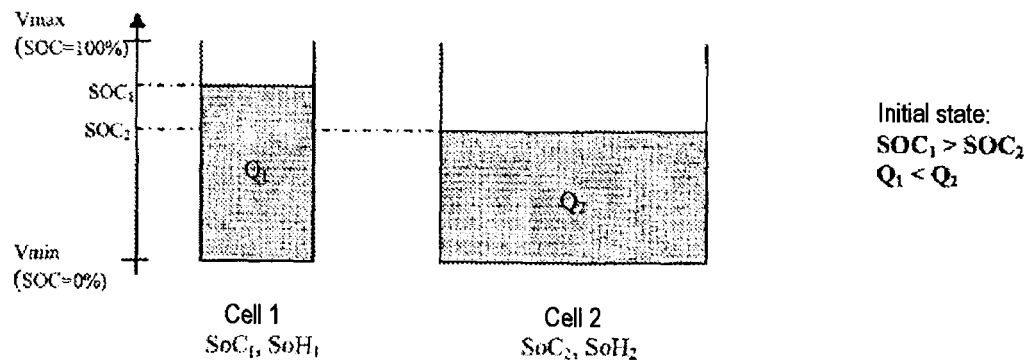
FIG. 1 shows a schematic example of two cells having different states of charge and maximum capacities at the same time.

FIG. 1 illustrates this last problem. Two individual cells having different states of charge and different maximum capacities at the same time are illustrated schematically in this figure.

The state of charge of one cell, also referred to as the SoC, corresponds to the ratio between the charge stored in this cell at a given moment and the maximum capacity $Q_{max}$ that this cell may contain in its usual operating range at the moment of the measurement.

In FIG. 1, the state of charge corresponds to the ratio between the filling height of each cell and the maximum height thereof. The charge of the cell corresponds to the surface of each cell (the height remaining the same so as to respect the same voltage operating ranges, the difference in maximum capacity is represented by a difference in width). FIG. 1 illustrates a situation in which the charge $Q_2$ contained in the cell 2 is greater than that $Q_1$ contained in the cell 1 (the gray surface represents the charge in each cell), although its SoC is lower. Thus:

$$Q_2 = SoC_2 \cdot SoH_2 \cdot Q_{max\_init2} > Q_1 = SoC_1 \cdot SoH_1 \cdot Q_{max\_init1}$$

For an individual cell i, the state of health SoHi is defined as the ratio between the maximum capacity $Q_{max\ i}$ that can be contained in the cell i at a given moment, and the initial maximum capacity $Q_{max\text{-}init\ i}$ that could be contained initially by the same cell, for example at the end of the production line. This initial capacity is often a characteristic known by the manufacturer for example.

In such a situation, a balancing strategy according to the prior art based solely on the states of charge SoC tends to transfer energy from the cell 1 to the cell 2 because $SoC_1 > SoC_2$. As the battery then discharges, $SoC_1$ decreases more quickly than $SoC_2$, the same primary current $I_c$ passing through each of the two cells 1 and 2 (the two cells empty at the same rate apart from the balancing). Thus:

$$SoC_i(t) = \frac{Q_i(t)}{Q_{max\,i}}$$
$$= \frac{Q_i(t=0) - \int_{t=0}^{t} I_c \cdot dt}{Q_{max\,i}}$$

Where i=1 or i=2

There is a moment $t_{imv}$ from which $SoC_1$ becomes lower than $SoC_2$. From this moment $t_{imv}$, the transfers of energy are performed in the opposite direction, that is to say from the cell 2 to the cell 1.

This known strategy has the following disadvantages:
greater energy losses: the first transfers performed (from the cell 1 to the cell 2) are futile because they are ultimately followed by reverse transfers (from the cell 2 to the cell 1). Since these transfers are necessarily accompanied by energy losses, some of the energy available is lost by carrying out this back-and-forth process, impaired balancing: the time necessary to transfer the energy in one direction then in the other is lost. Taking into account the limited power of balancing circuits, it is not always possible to rebalance the battery once $SoC_2$ becomes greater then $SoC_1$: the cell 1 may reach its low voltage limit or state of charge before the surplus charge in the cell 2 has been able to be transferred.

Based on this assertion, the object of the invention is to propose a management strategy based on different balancing criteria (not only based on the states of charge) so as to ensure that the transfers performed between the cells are optimal in terms of the utilization of the electric charges stored in the cells. This strategy applies both to the case of charging and to that of discharging, but also to the rest state of the battery. In particular, the balancing criteria may be different depending on whether the battery is being charged, discharged, or is in the rest state.

In accordance with an essential feature of the invention, the method for managing the electric charges of the cells of the battery comprises:
a step in which the states of charge ($SoC_i$) of the cells are balanced, this step being performed only during the battery charging phase, and
a step in which the quantities of charge ($Q_i$) contained in the cells are balanced, this step being performed only during the battery discharging or rest phase.

During the discharging or rest phase of the battery, the electric parameters to be balanced are therefore the quantities of charge $Q_i$ of the cells. This balancing step is based on balancing criteria based on the quantities of charge $Q_i$ contained in the cells so as to balance these between themselves where possible. During this step, the states of charge $SoC_i$ of the cells may also be taken into account so as to control the balancing only on the sole knowledge of the quantities of charge $Q_i$. In fact, the sole use of the quantities of charge independently of the states of charge may run the risk of resulting in a detrimental overshoot of an upper or lower threshold of the state of charge $SoC_i$ of one or more cells.

Conversely, the electric parameters to be balanced during the charging of the battery are the states of charge $SoC_i$ of the cells. This balancing step is based on the balancing criteria based on the states of charge $SoC_i$ of the cells so as to balance the cells between themselves where possible.

In an advantageous but non-limiting manner, the balancing performed is of the non-dissipative type, by transfer of energy between the cells. However, the balancing may also be of the dissipative type depending on the type of electronic balancing circuit used.

Figure 2:
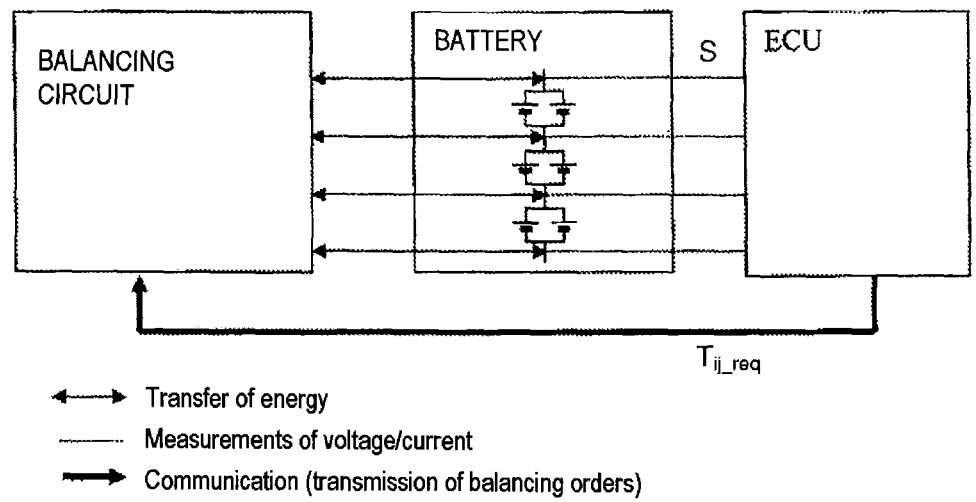
FIG. 2 shows a diagram illustrating the structure of a management system according to the invention.

With reference to FIG. 2, the management system used for the battery comprises an electronic balancing circuit for balancing the cells, for example of the non-dissipative type, and hardware and/or software means, which control the balancing circuit so as to perform the above management method. The hardware and/or software means in particular comprise a control unit or controller (ECU or "electronic control unit") capable of establishing balancing criteria $\epsilon_i$, capable of emitting activation requests $T_{ij\_req}$ for the transfers of energy to be performed by the balancing circuit from one cell to another cell, and additionally capable of receiving different signals S originating from the battery, such as the individual voltages of the cells and/or current measurements, which are used to estimate certain variables used by the construction of the balancing criteria $\epsilon_i$.

Figure 3:
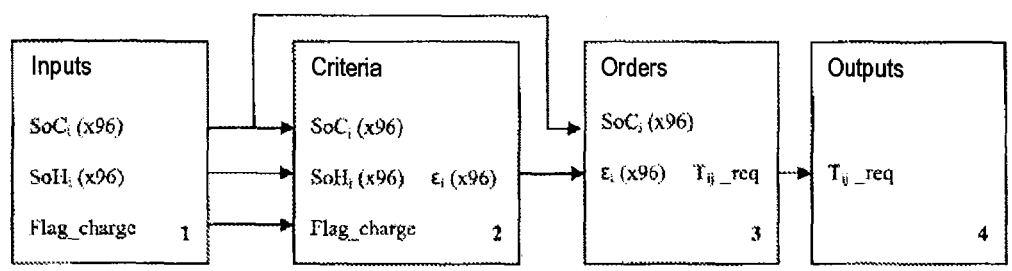
FIG. 3 illustrates the principle of the management strategy according to the invention.

FIG. 3 illustrates in greater detail the general principle of the strategy performed by the control unit:

In a first step, the states of charge $SoC_i$, the states of health $SoH_i$ for all the indicator cells i of the battery pack, and a Boolean signal "Flag_charge" representative of the fact that the battery is or is not in the charging state are determined prior to any other step and are then collected in the block 1 of FIG. 3.

For an individual cell i, the individual state of charge $SoC_i$ may be estimated for example on the basis of voltage and current measurements performed on the cell i.

Figure 5:
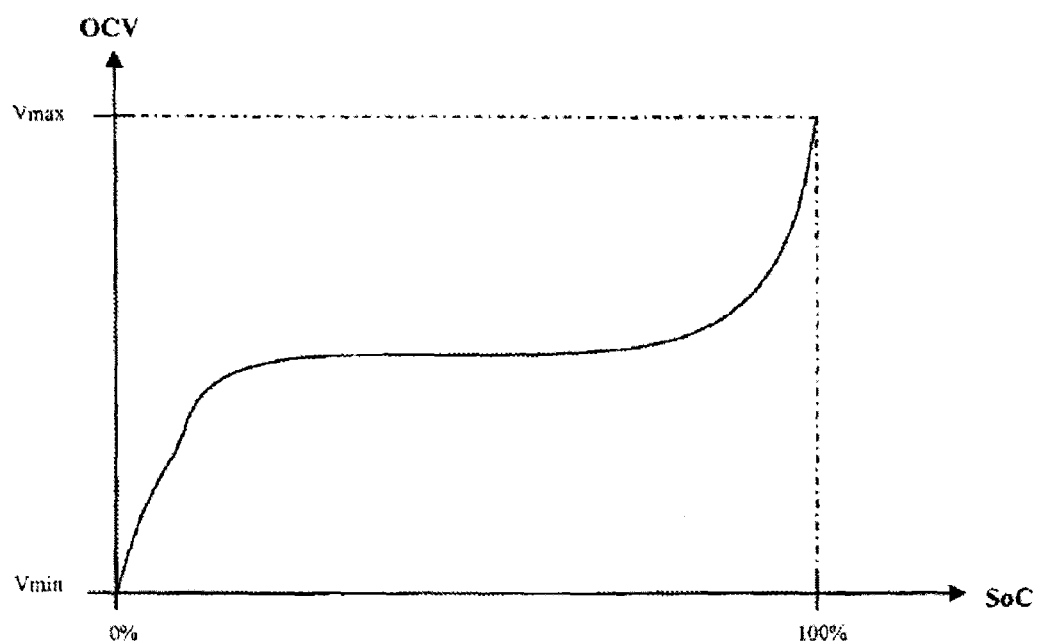
FIG. 5 illustrates the typical curve for an Li-ion cell between the no-load voltage and the state of charge SoC.

It should be noted that the cells generally used in the high-voltage batteries, that is to say in particular cells of the lithium-ion (Li-ion) type, observe a law linking the state of charge SoC to the open circuit voltage OCV at the terminals of said cell (see FIG. 5). This relationship, as a first approximation, is independent of the maximum capacity that may be contained in the cell: if this maximum capacity decreases (due to the aging of the cell for example), the maximum voltage will be reached for a lower contained charge.

In addition, the Boolean signal "Flag_charge" indicates whether or not the vehicle is charging. This signal is generally sent to the control unit by another controller. For example, the signal is 1 if the vehicle is in the recharging phase, and 0 if not.

It can be noted that the control unit, formed by an ECU, can be integrated generally into the global battery management system (BMS).

Figure 4:
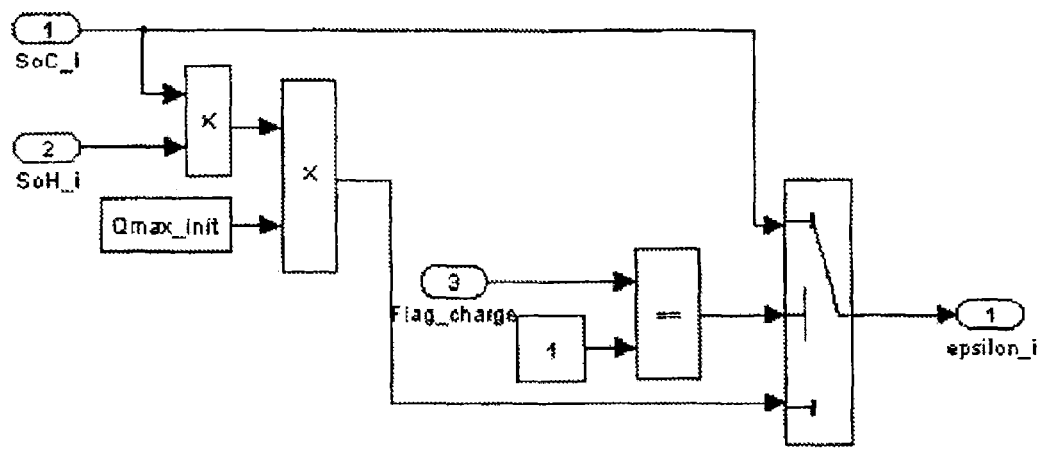
FIG. 4 shows a detailed view of the block 2 of FIG. 3.

In a second step, in the block 2 of FIG. 3, the balancing criteria $\epsilon_i$ are then established, based selectively on the states of charge $SoC_i$ of the cells or on the quantity of charge $Q_i$ stored in the cells. These are the balancing criteria on which the balancing algorithm will then be based. The block 2, which is illustrated in detail in FIG. 4, performs a step in which criteria are established and applied depending on whether or not the battery is being charged:

If "Flag_charge" is 1 (situation in which the battery is being charged), the criteria $\epsilon_i$ most suitable for balancing the battery are the individual states of charge $SoC_i$ of each of the cells i. The objective of the balancing is thus to charge each of the cells i to the maximum so as to store the maximum energy possible. The block 2 of FIG. 3 thus outputs the $SoC_i$ for all the N cells of the battery. Thus:

$$\forall i \in \|l, N\|, \epsilon_i = SoC_i$$

By contrast, if "Flag_charge" is 0 (situation in which the battery is not being charged), the criteria $\epsilon_i$ most suitable for the balancing of the battery are the charges $Q_i$ contained in each of the cells i. The individual charge $Q_i$ of each cell i is obtained on the basis of its $SoC_i$ and its $SoH_i$ and on the value of the maximum initial capacity. Thus:

$$\checkmark i \in \|l, N\|, \epsilon_i = SoC_i \cdot SoH_i \cdot Q_{max\_init1} = Q_i$$

In a third step, activation requests $T_{ij\_req}$ are then generated in the block 3 of FIG. 3, which at the input receives the criteria $\epsilon_i$ established by the block 2 but also the states of charge $SoC_i$ originating directly from the block 1 with bypassing of the block 2, so as to select the way in which the electronic balancing circuit for balancing the cells of the battery is to be activated. These requests $T_{ij\_req}$ are dependent on the balancing criteria established in the block 2 and take into account the topology and the limitations of the balancing circuit. Since the block 3 is basically dependent on the specific features of the balancing circuit used, it will not be described in greater detail. The requests $T_{ij\_req}$ produced at the output make it possible to ensure the balancing of the battery by the circuit on the basis of the selected criteria $\epsilon_i$ (whether balancing of the quantities of charge $Q_i$ or balancing of the states of charge $SoC_i$). As indicated before, the activation requests dependent on the balancing criteria $\epsilon_i$ based on the quantities of charge $Q_i$ contained in the cells i may possibly also take into account the states of charge $SoC_i$ of the cells.

In a fourth step, the block 4 of FIG. 3 then contains the outputs formed by the requests $T_{ij\_req}$ produced by the block 3. These outputs or requests are then emitted to the balancing circuit to ensure a balancing of the battery in accordance with the established criteria $\epsilon_i$.

During the charging of the battery, the objective is to store the maximum energy. There is no desire to balance the quantities of charge $Q_i$ contained in the cells, but instead to fill each cell to its maximum. The relevant criterion is therefore the individual state of charge $SoC_i$ which takes into account the limitations of the operating range of the cells.

During the discharging or the rest phase of the battery, or once the battery has been partly discharged, the objective by contrast is to balance where possible the quantities of charge $Q_i$ contained in the cells, knowing that, during the discharging, all of these cells i will be subjected to the same primary current $I_c$ applied across the battery (if the cells are assembled in series). The cells therefore empty at the same rate and are subject to identical variations in quantities of charge $Q_i$. The limitation of the operating range of the cells must be respected however, which may impose certain limitations on the method of balancing the quantities of charge $Q_i$: it is not possible to exceed the upper voltage limit of a cell i, corresponding to $SoC_i = 100\%$, if it is sought to balance the quantities of charge $Q_i$. The individual $SoC_i$ of the cells are therefore also sent to block no. 3 of FIG. 3, bypassing the block 2, such that the restrictions on the operating range of the cells can still be taken into account during the balancing of the criteria $\epsilon_i$ based on the quantities of charge $Q_i$.

The balancing strategy described above makes it possible to compensate for the additional cost associated with the insertion of a non-dissipative circuit and to ensure optimum use of the energy contained in the battery, even in the presence of discrepancies over the individual maximum charge capacities of the cells.

Conversely to the known balancing strategies that only use the individual state of charge $SoC_i$ of each cell, the implementation of the management strategy described above allows optimum use of the total energy contained in the battery, in particular in the presence of discrepancies over the maximum charge capacities of the cells (that is to say the maximum charges that can be contained in the cells).

The invention makes it possible to take into consideration and to effectively handle differences in physical characteristics between the cells so as to compensate for their differences, at least in part (depending on the power limit of the balancing circuit). The discrepancy of the maximum charges may have different origins: different faradic yields from one cell to the other, maximum capacities and/or self-discharge currents differing from one cell to the other.

The faradic yield is defined, during a charging process, by the ratio between the charges stored by the cell and those that have been provided thereto. The self-discharge current corresponds to the speed at which a cell empties without any charge being connected at its terminals. Lastly, the maximum capacity represents the maximum charge that can be stored by a cell.

The invention also relates to a data recording support, which can be read by the control unit and on which a computer program is recorded comprising computer program code means for performing phases and/or steps of the balancing method.

The invention also relates to a computer program comprising a computer program code means suitable for carrying out phases and/or steps of the balancing method when the program is run on the control unit.

The invention may advantageously be used in the automotive industry, in particular within the scope of a motor vehicle having electric traction, implementing batteries constructed on the basis of individual cells of the lithium-ion (Li-ion) type. This management strategy, however, may apply to any type of balancing, preferably non-dissipative balancing (although this is in no way limiting), used in the different automotive fields, and for cell chemistries differing from Li-ion.

The invention claimed is:

1. A method for managing electric charges of cells of an electricity storage battery, which are electrically connected in series and/or in parallel, the method comprising:
   balancing states of charge of the cells, performed only during a battery charging phase, the states of charge being an amount of fullness of the cells with respect to maximum capacity;
   balancing quantities of charge contained in the cells, performed only during a battery discharging or rest phase, the quantities of charge being a total amount of charge contained in the cells;
   generating activation requests, dependent on the established balancing criteria, for activation of an electronic balancing circuit for balancing the cells of the battery;
   and emitting to the balancing circuit the generated activation requests for balancing of the battery in accordance with the established balancing criteria.

2. The management method as claimed in claim 1, wherein the balancing the quantities of charge contained in the cells utilizes the states of charge.

3. The management method as claimed in claim 1, wherein the balancing is of non-dissipative type, by transfer of energy between the cells.

4. The management method as claimed in claim 1, further comprising:
   establishing balancing criteria based selectively on the states of charge of the cells or on the quantities of charge contained in the cells.

5. The management method as claimed in claim 4, wherein the activation requests dependent on the balancing criteria based on the quantity of charge contained in the cells are dependent on the states of charge of the cells.

6. The management method as claimed in claim 4, wherein the establishing utilizes a fact that the battery is or is not in the charging phase.

7. The management method as claimed in claim 1, further comprising, prior to the determining the state of charge, determining a state of health of each of the cells and a Boolean signal representative of a fact that the battery is or is not in the charging phase.

8. A system for managing electric charges of cells of an electricity storage battery, which are electrically connected in series and/or in parallel, comprising:
   an electronic balancing circuit for balancing electric charges of the cells; and
   control circuitry, which control the balancing circuit to perform a management method as claimed in claim 1.

9. The management system as claimed in claim 8, wherein the control means comprises a control unit executing:
   establishment of balancing criteria based selectively on the states of charge of the cells or on the quantities of charge contained in the cells;
   generation of activation requests, dependent on the established balancing criteria, for activation of the electronic balancing circuit for balancing the cells of the battery; and
   emission to the balancing circuit of the generated activation requests for balancing of the battery in accordance with the established criteria.

10. A non-transitory computer readable medium comprising a computer program code that when executed by a computer causes the computer to carry out the method as claimed in claim 1.

* * * * *